United States Patent
Awater et al.

(10) Patent No.: US 6,175,551 B1
(45) Date of Patent: Jan. 16, 2001

(54) TRANSMISSION SYSTEM AND METHOD EMPLOYING PEAK CANCELLATION TO REDUCE THE PEAK-TO-AVERAGE POWER RATIO

(75) Inventors: Geert Arnout Awater, Utreecht; Richard D. van Nee, De Meern; Arnout Hendrik de Wild, Utrecht, all of (NL)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 08/904,176

(22) Filed: Jul. 31, 1997

(51) Int. Cl.[7] .................................................. G01R 31/08
(52) U.S. Cl. .......................................... 370/210; 370/203
(58) Field of Search .................................... 370/203, 204, 370/206, 208, 209, 210, 335, 342, 343, 344; 375/200, 271, 279

(56) References Cited

U.S. PATENT DOCUMENTS

| | | | |
|---|---|---|---|
| 5,302,914 | * 4/1994 | Arntz | 455/126 |
| 5,602,833 | * 2/1997 | Zehavi | 370/209 |
| 5,610,908 | 3/1997 | Shelswell et al. . | |
| 5,710,990 | * 1/1998 | Long | 455/103 |
| 5,717,713 | * 2/1998 | Natali | 370/209 |
| 5,841,813 | * 11/1998 | Van Nee | 375/279 |
| 5,862,182 | * 1/1999 | Awater | 375/279 |
| 5,881,056 | * 3/1999 | Huang | 370/335 |

* cited by examiner

*Primary Examiner*—Douglas W. Olms
*Assistant Examiner*—Ricardo M. Pizarro
(74) *Attorney, Agent, or Firm*—Gibbons, Del Deo, Dolan, Griffinger & Vecchione

(57) ABSTRACT

The present invention teaches a system and method to reduce the peak-to-average power ratio of systems transmitting parallel channels. Examples of such systems are Orthogonal Frequency Division Multiplex (OFDM) and Orthogonal Code Division Multiplex (OCDM), also known as multi-code CDMA. Both systems have the disadvantage of a large peak-to-average power (PAP) ratio, which degrades the efficiency of the power amplifier of the transmitter. The present invention reduces the PAP problem by canceling the large signal peaks through subtraction of an appropriate reference function. That is, a time shifted and scaled reference function is subtracted from the sampled signal, such that each subtracted reference function reduces the peak power of at least one signal sample. In accordance with the present invention, an appropriate reference function with approximately or exactly the same bandwidth as the transmitted signal is selected. In this way it is assured that the peak power reduction does not cause any out-of-band interference. One example of a suitable reference signal for use in the present invention is a sinc function. The present invention also describes a variety of systems for implementation of the peak reduction technique. In accordance with another embodiment of the present invention, forward error correction coding is applied across several OFDM/OCDM symbols, in order to correct for symbols with low average power. In case of packet transmission, a different data scrambling is applied for each retransmission, in order to ensure that the PAP ratios and error probabilities are uncorrelated for initial packets and retransmissions.

20 Claims, 6 Drawing Sheets

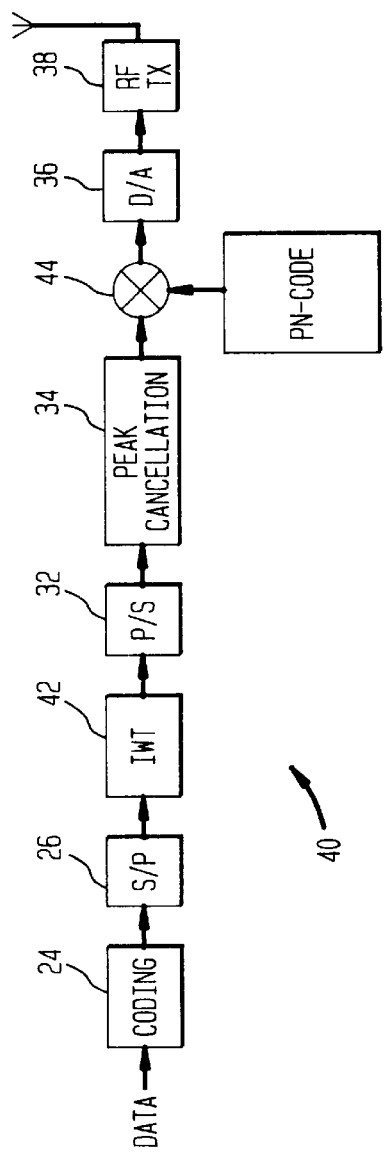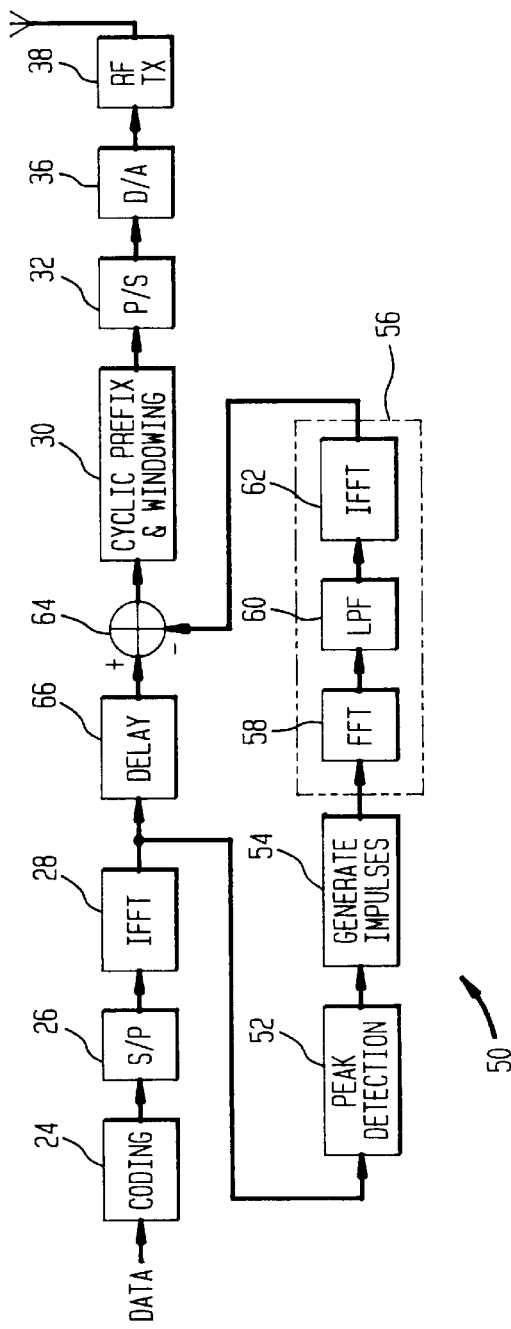

US 6,175,551 B1

TRANSMISSION SYSTEM AND METHOD EMPLOYING PEAK CANCELLATION TO REDUCE THE PEAK-TO-AVERAGE POWER RATIO

FIELD OF THE INVENTION

The present invention relates generally to a system and method for transmitting digital data by multiplexing a number of closely spaced adjacent carriers, such as, Orthogonal frequency division multiplex (OFDM) and Orthogonal Code Division Multiplex (OCDM) systems, and more particularly to techniques for reducing the peak-to-average power ratio of signals transmitted in such systems.

BACKGROUND OF THE INVENTION

Orthogonal frequency division multiplex (OFDM) signals have been proposed for various communications applications. An OFDM signal consists of a number of adjacent carriers, closely spaced in frequency, and each modulated with data. With OFDM, a data stream of $\chi$ bps is transmitted over N subcarriers, each carrying $\chi/N$ bps. An advantage of OFDM technology is that the symbol rate of the data stream is decreased by a factor of N, which gives a proportional increase in delay spread tolerance. That is, delay spread or inter-symbol interference due to signal dispersion can be reduced or even eliminated by inserting a guard time interval between the transmission of subsequent symbols, thus avoiding use of an equalizer as required in single carrier systems. The guard time allows delayed copies of each symbol to die out before the succeeding symbol is received. Thus, OFDM is attractive because of its ability to overcome the adverse effects of multi-channel transmission without the need for equalization. Orthogonal Code Division Multiplex (OCDM), also known as multi-code CDMA is similar to OFDM, with a difference that instead of N subcarriers, N codes are transmitted simultaneously.

A disadvantage with the transmission of both OFDM and OCDM signals is that the maximum possible peak power is N times larger than the average transmitted power. This large peak-to-average power (PAP) ratio reduces the efficiency of the corresponding transmitter power amplifier. In order to avoid distortion of the transmitted signal, a backoff (which is the reduction in average transmitted power relative to the maximum possible output power) has to be used which is about the same as the PAP ratio of the input signal. There is a certain tradeoff between distortion and power efficiency. That is, efficiency can be improved by decreasing the backoff, allowing for more distortion. The amount of distortion that can be tolerated, however, depends on spectral regulations and required error rate.

Due to the tradeoff which exists between power efficiency and distortion, a need exists for a system which maximizes power efficiency while at the same time minimizing distortion.

SUMMARY OF THE INVENTION

The present invention teaches a system and method to reduce the peak-to-average power ratio of systems transmitting parallel channels. Examples of such systems are Orthogonal Frequency Division Multiplex (OFDM) and Orthogonal Code Division Multiplex (OCDM), also known as multi-code CDMA. Both systems have the disadvantage of a large peak-to-average power (PAP) ratio, which degrades the efficiency of the power amplifier of the transmitter. The present invention reduces the PAP problem by canceling the large signal peaks through subtraction of an appropriate reference function. That is, a time shifted and scaled reference function is subtracted from a sampled signal interval or symbol, such that each subtracted reference function reduces the peak power of at least one portion or signal sample of the symbol. In accordance with the present invention, an appropriate reference function with approximately the same bandwidth as the transmitted signal is selected. In this way it is assured that the peak power reduction does not cause any out-of-band interference. One example of a suitable reference signal for use in the present invention is a sinc function. The present invention also describes a variety of systems for implementation of the peak reduction technique.

In accordance with another embodiment of the present invention, forward error correction coding is applied across several OFDM/OCDM symbols, in order to correct for symbols with low average power resulting from the peak reduction. In case of packet transmission, a different data scrambling is applied for each retransmission, in order to ensure that the PAP ratios and error probabilities are uncorrelated for initial packets and retransmissions.

BRIEF DESCRIPTION OF THE DRAWINGS

For a better understanding of the present invention, reference is made to the following description of an exemplary embodiment thereof, considered in conjunction with the accompanying drawings, in which:

FIG. 3 is an exemplary OCDM transmitter in accordance with the principles of the present invention;

FIG. 4 is an alternate embodiment of a transmitter according to the present invention illustrating peak cancellation using FFT/IFFT to generate the cancellation signal;

DETAILED DESCRIPTION OF THE DRAWING

The present invention teaches a system and method to reduce the peak-to-average power ratio of communication systems transmitting parallel channels. Examples of such systems are Orthogonal Frequency Division Multiplex (OFDM) and Orthogonal Code Division Multiplex (OCDM), also known as multi-code CDMA. Both systems have the disadvantage of a large peak-to-average power (PAP) ratio, which degrades the efficiency of the transmitter power amplifier. The present invention teaches a system and method to reduce the PAP problem.

A key element of the invention is to reduce the amplitude of transmission signal samples whose power exceeds a certain threshold. The peak power reduction is achieved by a cancellation technique, whereby a time shifted and scaled reference function is subtracted from a sampled signal interval or symbol, such that each subtracted reference function reduces the peak power of at least one portion or signal sample of the symbol. In accordance with the present invention, an appropriate reference function with approximately the same bandwidth as the transmitted signal is selected. In this way it is assured that the peak power reduction does not cause any out-of-band interference. One example of a suitable reference signal for use in the present invention is a sinc function. As would be understood by a person skilled in the art, a disadvantage of using the sinc function is that it has an infinite support. Hence, for practical use, it has to be time-limited in some way. One way to time-limit such a reference function without creating unnecessary out-of-band interference is multiplication by a windowing function, for instance a raised cosine window. As would be understood, the windowing function has finite support and, therefore, the product of the window function and the sinc function also has finite support.

Figure 1:
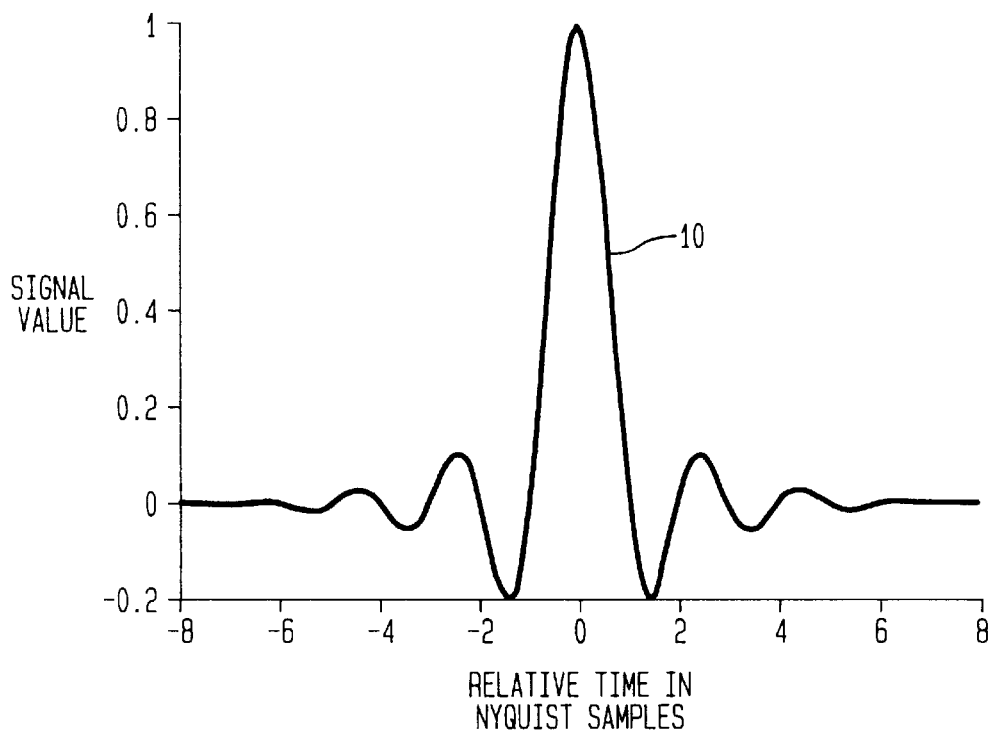
FIG. 1 is an exemplary sinc reference function in accordance with the present invention; this reference function is windowed with a raised cosine window.

Referring to FIG. 1, there is shown an exemplary reference function 10 in accordance with the principles of the present invention obtained by multiplication of a sinc function and a raised cosine windowing function. As would be understood by a person skilled in the art, if the windowing function is the same as that used for windowing of the OFDM/OCDM symbols of an original unaltered transmission, then it is assured that the reference function has no more out-of-band power than the unaltered OFDM/OCDM transmission signals. Accordingly, the peak cancellation techniques of the present invention will not degrade the out-of-band spectrum properties. Also, by making the reference signal window narrower, a trade-off can be made between less complexity of the peak cancellation and some increase of the out-of-band power.

In one embodiment of the present invention, the peak cancellation is accomplished digitally after generation of the digital OFDM/OCDM symbols. The peak cancellation involves a peak power (or peak amplitude) detector, a comparator to see if the peak power exceeds some threshold, and a scaling of the peak and surrounding samples as is explained in greater detail below.

Figure 2:
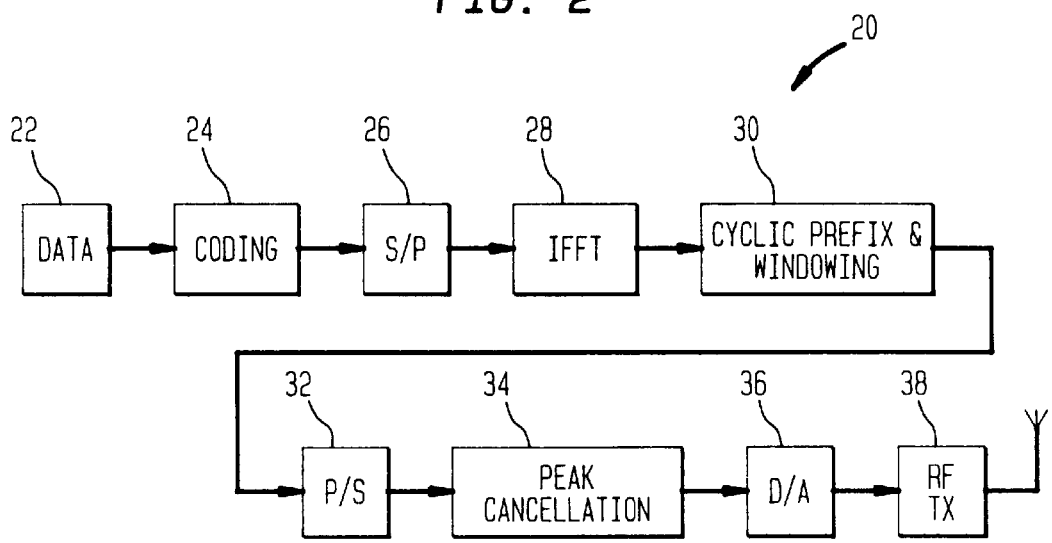
FIG. 2 is an exemplary OFDM transmitter in accordance with the principles of the present invention.

Referring to FIG. 2, a functional block diagram of signal circuitry for an OFDM transmitter 20 with peak cancellation is shown in accordance with the present invention. Incoming data from a signal source 22 entering the transmitter 20 is first coded at coding block 24 which receives the data stream and partitions the data stream into successive groups or blocks of bits representing N complex signal samples. N represents the number of subcarriers in the OFDM system. As would be understood, other coding such as forward error correction coding may also be introduced at the coding block 24. The serial bit stream of each of the blocks is converted to parallel form at serial-to-parallel converter 26. An Inverse Fast Fourier Transform (IFFT) is performed on each of these blocks at IFFT block 28. As would be understood, the serial to parallel conversion demultiplexes the data stream and the IFFT operation is essentially equivalent to multiplexing and modulating the data stream where respective data from the blocks of bits is modulated onto each of the subcarriers. Next, a cyclic prefix is added at windowing block 30, extending the symbol size to $N+N_G$ samples, where $N_G$ is representative of a guard band. The extended symbol is also multiplied by a windowing function. Parallel-to-serial conversion next takes place at parallel to serial converter 32. A peak cancellation block 34 includes circuitry for implementation of the peak cancellation procedure of the present invention which is applied to reduce the PAP ratio.

As was previously discussed, the peak cancellation block 34 will generally include a peak power (or peak amplitude) detector, a comparator to detect if the peak power exceeds some threshold, and circuitry for providing a scaling of the peak and surrounding samples. Following the peak cancellation block 34, a digital-to-analog converter 36 converts the digital signal to an analog signal where the analog signal is transmitted by RF transmission block 38. Except for the peak cancellation block 34, there is essentially no difference to the transmitter 20 of the present invention than with a standard OFDM transmitter. For the receiver, there is no difference at all, so any standard OFDM receiver can be used in accordance with the present invention. In accordance with the principles of the present invention, it is also possible to perform peak cancellation immediately after the IFFT function and before the cyclic prefix and windowing function as will be explained.

Referring to FIG. 3, a functional block diagram for an OCDM (or multi-code transmission) transmitter 40 is shown according to the present invention. As can be seen, the functional block diagram for the OCDM transmitter 40 is similar to that for the OFDM transmitter in FIG. 2 and, as such, like functional blocks are labeled with like reference numbers. An essential difference is that instead of an IFFT block, a Walsh transform block 42 is included in place of the IFFT block which implements an inverse Walsh transform or other operation which produces the sum of several spreading codes. Further, subsequent to the peak cancellation block 42, the signal is multiplied by a pseudo-noise code, which couples between the peak cancellation block and the D/A converter. The pseudo-noise code has a repetition period which is much longer than the symbol period at multiplier 44.

In the previously described exemplary embodiments of an OFDM and OCDM transmitter, peak cancellation was performed after parallel to serial conversion of the signal. As mentioned, it is also possible to perform the peak cancellation after the IFFT or IWT block. Referring to FIG. 4, an alternate embodiment of an OFDM transmitter 50 is shown in accordance with the principles of the present invention, where such principles would be equally applicable to an OCDM transmitter. In the case of FIG. 4, the peak cancellation is performed on a symbol-by symbol basis. An efficient way to generate the cancellation signal without using a stored reference function is to use a lowpass filter in the frequency domain. As shown in FIG. 4, subsequent to the IFFT being performed at IFT block 28 for each OFDM signal, a peak detector 52 detects which samples exceed some predefined amplitude. For each signal peak which exceeds the predefined amplitude an impulse is generated from impulse generator 54 whose phase is equal to the peak phase and whose amplitude is equal to the peak amplitude minus the desired maximum amplitude. The impulses are then lowpass filtered on a symbol by symbol basis at filter block 56. As would be understood by a person skilled in the art, lowpass filtering is achieved in the frequency domain by taking the FFT 58, setting all outputs to zero whose frequencies exceed the frequency of the highest subcarrier 60, and then transforming the signal back to the time domain by way of an IFFT 62. The resultant signal is added (or actually subtracted) at adder 64 back into the signal path prior to the prefix and windowing function block 30. A delay block 66 is coupled between the adder 64 and the IFFT block 28.

Figure 5:
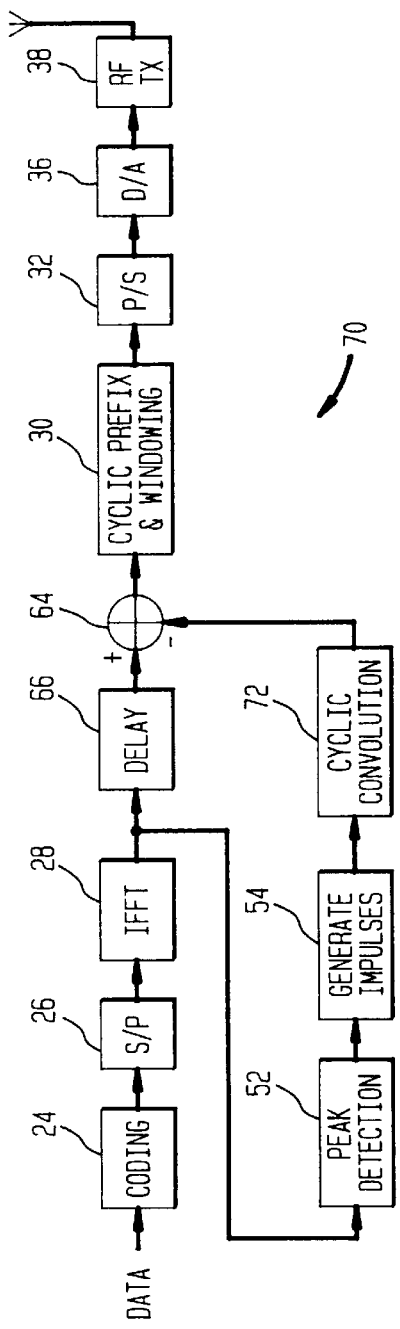
FIG. 5 is an alternate embodiment of a transmitter according to the present invention illustrating peak cancellation using a cyclic convolution filter to generate the cancellation signal.

Referring to FIG. 5, an alternate embodiment of an OFDM transmitter 70 is shown which accomplishes lowpass filtering in the time domain rather than the frequency domain. The embodiment of FIG. 5 differs from that shown in FIG. 4 in that a filter 72 which performs a cyclical convolution is substituted for the lowpass filter block 56. Cyclical convolutional filters are well known to those skilled in the art. As would be understood, if a non-cyclical convolutional filter is used, then a filter with an impulse response similar to that described with respect to FIG. 1 can be used. Since the impulse response is essentially noncausal, such a filter has to be built in practice by introducing a delay equal to the tail of the impulse response.

Figure 6:
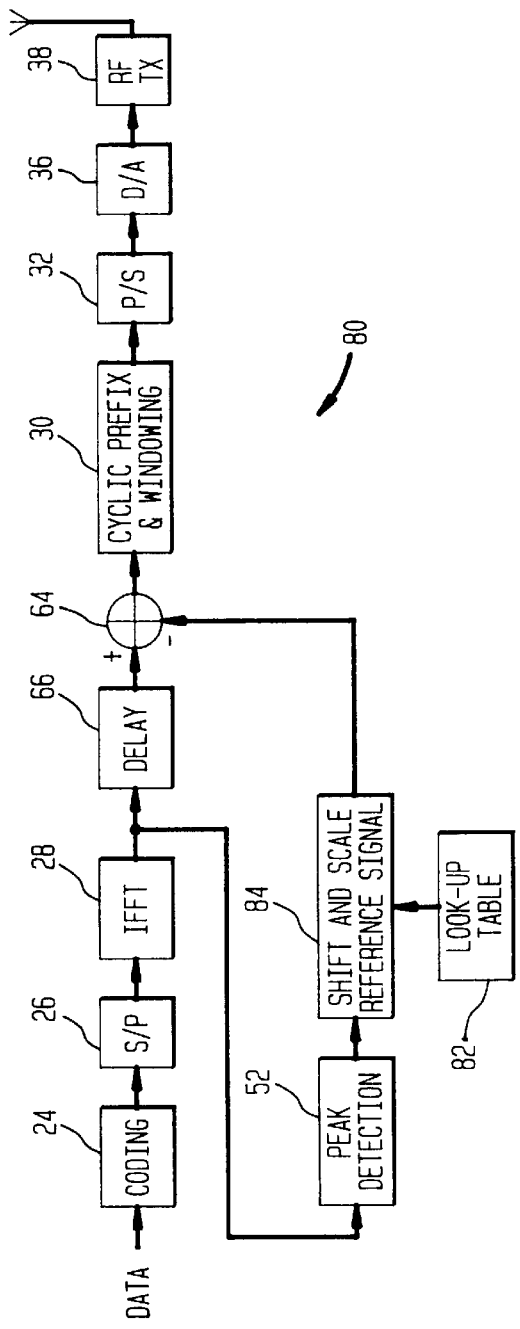
FIG. 6 is an alternate embodiment of a transmitter according to the present invention illustrating peak cancellation using a look-up table to generate the cancellation signal.

Referring to FIG. 6, an embodiment of a transmitter 80 is shown which implements the peak cancellation by way of a look-up table approach. As with the previous figures, like functional blocks are referenced to with like reference numbers. As with the embodiments described with respect to FIG. 4 and 5, the peak cancellation takes place immediately after the IFFT 28 (or IWT) and a peak detector 52 couples to the main signal path following the IFFT block 28. For each peak, a cancellation signal is generated by selection of a reference signal from a look-up table 82. The reference signal is then cyclically shifted according to the peak delay, and the amplitude and phase are scaled such that the signal peak is reduced to the desired value after cancellation at block 84.

Figure 7:
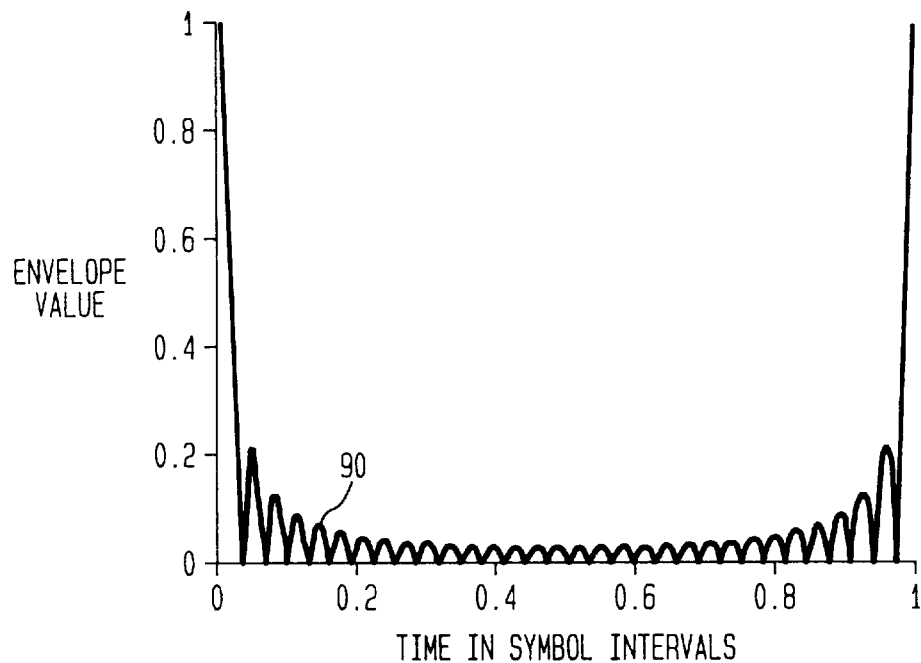
FIG. 7 shows an envelope of an exemplary cyclic reference function.

Referring to FIG. 7, an exemplary cyclic reference function 90 is shown that is used in accordance with the present invention in methods that apply cancellation before adding the cyclic prefix and windowing. As can be seen, this reference signal is itself a valid OFDM symbol, which is obtained in the case of an all ones input to the IFFT 28.

Figure 8:
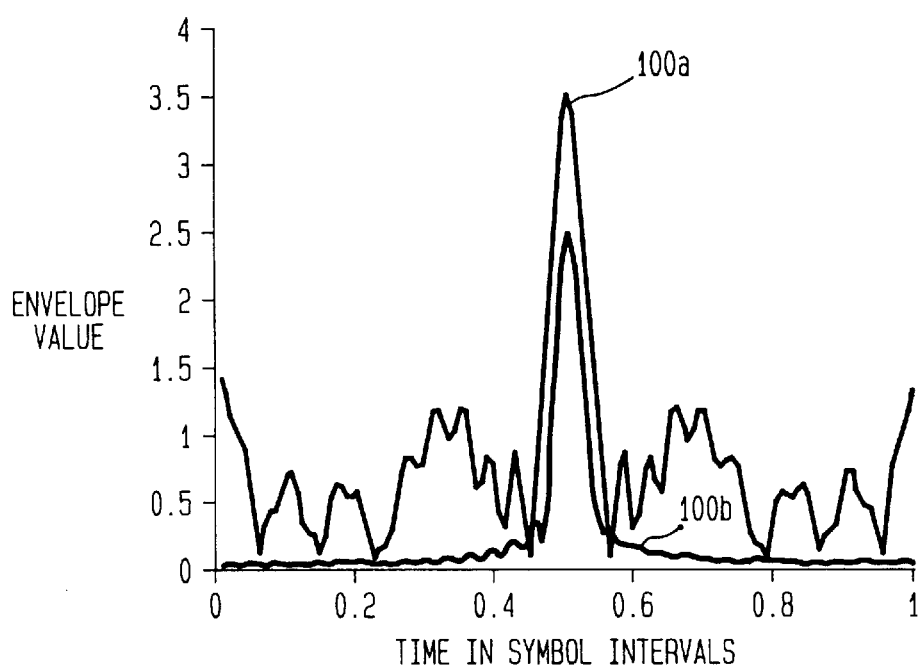
FIG. 8 shows a) an exemplary OFDM symbol envelope and b) an exemplary cancellation signal envelope.
Figure 9:
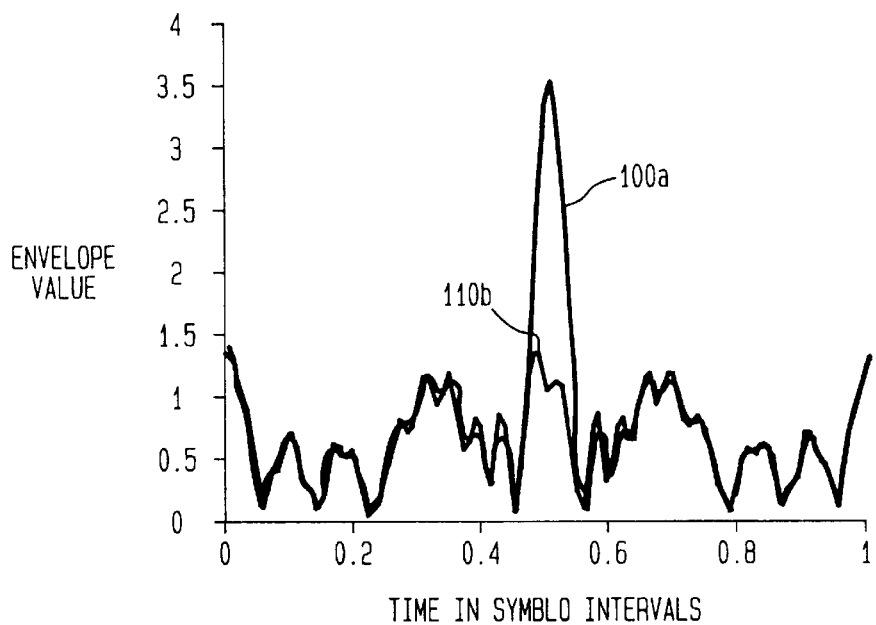
FIG. 9 shows a) an exemplary OFDM symbol envelope and b) a signal envelope after cancellation.

Referring to FIG. 8, there is shown an example of signal envelopes for one arbitrary OFDM symbol 100a and a corresponding cancellation signal 100b. In this particular case, the cancellation signal actually consists of two separate sinc functions. This is because one sinc function is not wide enough to reduce the peak in this example. After subtraction, the peak amplitude is reduced to a maximum of 3 dB above the root mean square value, as shown in FIG. 9 by envelopes 100a, 100b.

A disadvantage of peak cancellation is that symbols with a large PAP ratio suffer more degradation after peak cancellation has been applied, so they are more vulnerable to errors. To reduce this effect, forward error correction coding can be applied across several OFDM/OCDM symbols. By doing so, errors caused by symbols with a large degradation can be corrected by the surrounding symbols. As would be understood by a person skilled in the art, in a coded OFDM/OCDM system, the error probability is no longer dependent on the power of individual symbols, but rather on the power of a number of consecutive symbols. Accordingly, instead of being sensitive to single symbols with a large PAP ration, the system only experiences a signal-to-noise ratio (SNR) degradation when a certain number of consecutive symbols all have a large PAP ratio. As an example, assume that the forward error correction code produces an error if more than 4 out of every 10 symbols have a PAP ratio exceeding 10 dB, so peak cancellation will attenuate those symbols by 4 dB. (The simplifying assumption is made here that 4 symbols with reduced power always result in an error, while in reality there is always a certain error probability <1, depending on the signal-to-noise ratio.) Further assume that the probability of a PAP ratio larger than 10 dB is $10^{-3}$. Then, the error probability of the peak cancellation technique is $$1 - \sum_{i=0}^{3} \binom{10}{i} (10^{-3})^i (1 - 10^{-3})^{10-i} \cong 2 \cdot 10^{-10},$$

which is much less than the $10^{-3}$ in case no forward error correction coding is used.

Although such a low symbol error probability may be good enough for real-time circuit switched traffic, such as voice, it may still cause problems for packet data. A packet with too many large PAP ratio symbols will have a large probability of error. Such packets occur only very infrequently, as shown above, but when they occur, they may never be received correctly, because every retransmission of the packet has the same large error probability. To solve this problem, standard scrambling techniques can be used to ensure that the transmitted data between initial transmission and retransmissions is uncorrelated. This will then guarantee independent PAP ratios for the OFDM/OCDM symbols in retransmissions and thus, independent error probabilities. For example, if the probability of a worst case packet is $10^{-10}$, the probability that it does not get through within two transmissions is $10^{-20}$.

Figure 10:
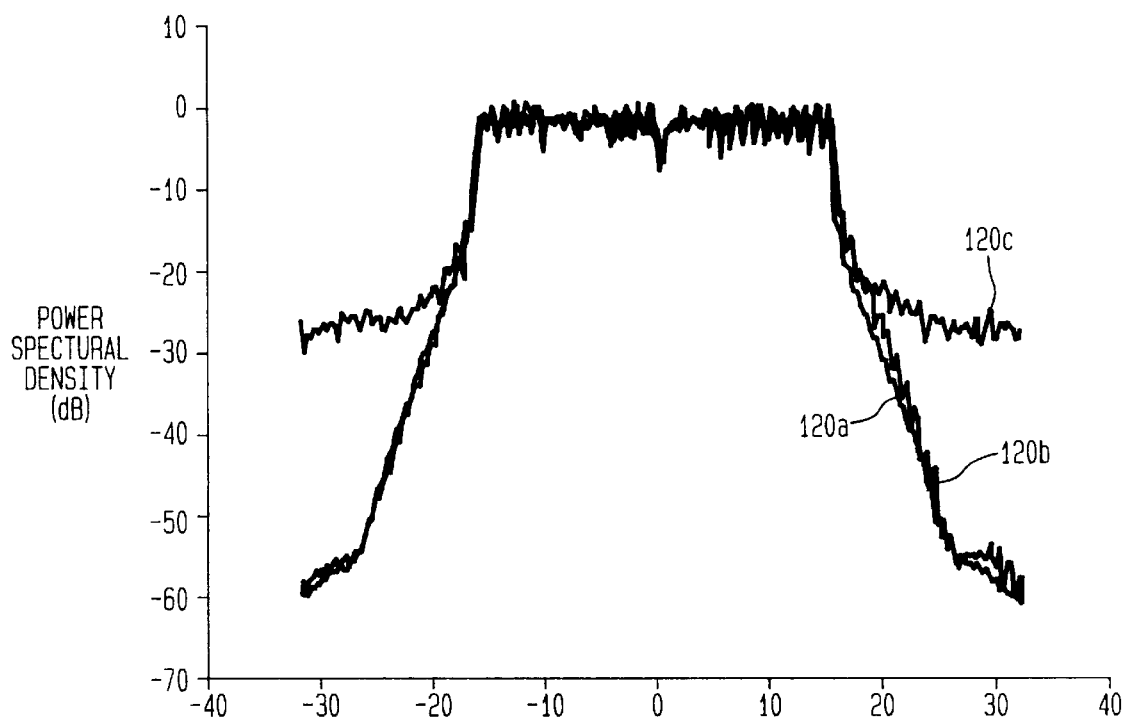
FIG. 10 shows the power spectral density for a) an undistorted spectrum with 32 subcarriers, PAP=15 dB, b) the spectrum after peak cancellation to PAP=4 dB, c) clipping to PAP=4 dB; the reference cancellation function has a width of 16 samples, which is approximately ¼ of the width of an OFDM symbol.

As an example of the peak cancellation technique, FIG. 10 shows simulated power spectral densities for an OFDM system with 32 carriers. Without clipping or peak cancellation, the worst case PAP ratio of this system is 15 dB, and the undistorted spectrum is depicted by curve 120a. If the signal is clipped such that the PAP ratio reduces to 4 dB, a significant spectral distortion is visible, see curve 120c. When peak cancellation is applied (120b), a negligible distortion is present for the same PAP ratio of 4 dB.

Figure 11:
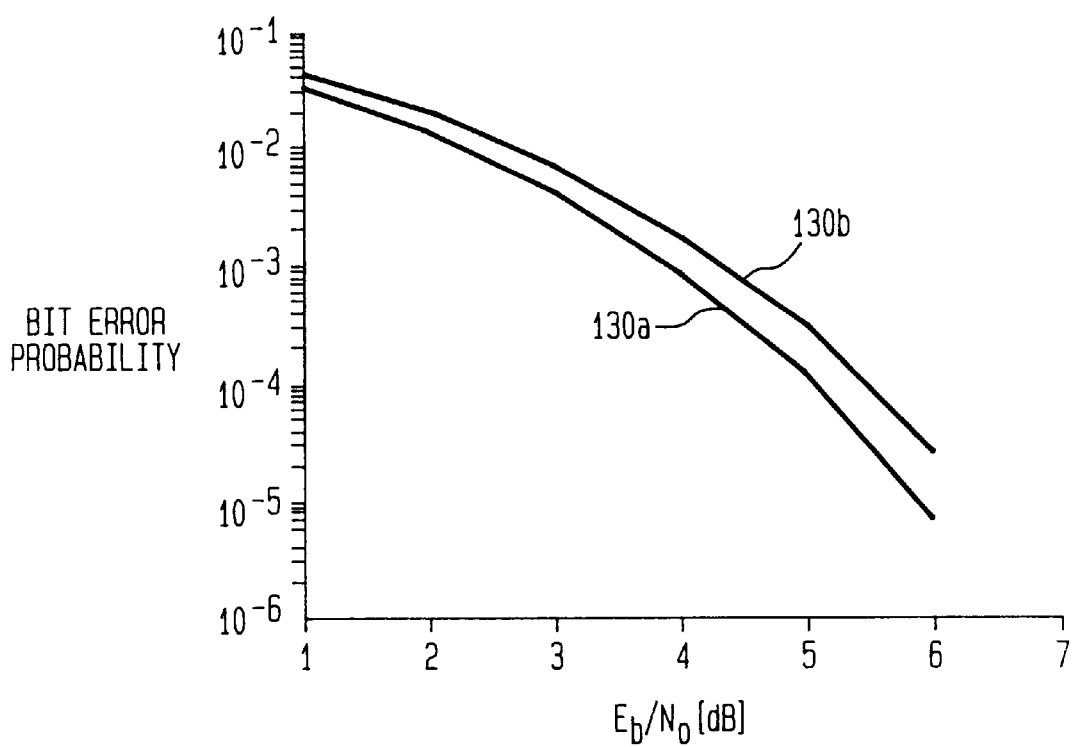
FIG. 11 shows a graph of the bit error rate versus signal-to-noise ratio for an OFDM signal with 32 subcarriers and a rate ½ convolutional, constraint length 7 convolutional code for: a) no PAP reduction, b) PAP reduced to 4 dB with peak cancellation.

The effect of the peak cancellation on the bit error ratio is depicted in FIG. 11. A rate ½, constraint length 7 convolutional code is used to encode the input bits. The coded bits are then modulated onto 32 OFDM subcarriers using QPSK. Curve 130a shows no PAP reduction and 130b shows PAP reduced to 4 dB with peak cancellation.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. A method of reducing a peak-to-average power ratio of a multi-carrier multiplexed signal to be transmitted, said method comprising the steps of:

coding a digital input data stream into blocks of N data streams, where N represents a number of subcarriers in said signal;

multiplexing data of said N data streams and modulating said subcarriers to provide symbols of modulated data;

detecting peak power amplitudes for said symbols and determining whether said peak amplitudes exceed a given threshold; and scaling said peak power amplitudes, if said peak amplitudes exceed said given threshold, wherein said step of scaling includes:
   generating impulses having phases substantially equal to a peak phase of a corresponding one of said symbols and having an amplitude substantially equal to a peak amplitude of said corresponding one of said symbols minus a desired maximum amplitude;
   lowpass filtering said impulses on a symbol by symbol basis; and
   subtracting a reference function from a corresponding symbol, wherein said subtracted reference function reduces said peak power amplitude of at least one signal sample of said corresponding symbol and said signal to be transmitted.

2. The method of claim 1, wherein said reference function includes at least one sinc function.

3. The method of claim 1, wherein said reference function is windowed to a bandwidth approximately the same as said at least one sample of said corresponding symbol.

4. The method of claim 1, wherein said reference function is a windowed sinc function.

5. The method of claim 1, wherein said reference function is a cyclic convolution function.

6. The method of claim 1, wherein said lowpass filtering is accomplished in a frequency domain.

7. The method of claim 1, wherein said lowpass filtering is accomplished in a time domain.

8. The method of claim 1, wherein said step of scaling includes selecting said reference signal from a look-up table.

9. The method of claim 1, wherein said multi-carrier division multiplexed signal is selected from a group consisting of Orthogonal Frequency Division Multiplex and Orthogonal Code Division Multiplex systems.

10. The method of claim 1, wherein the step of coding further comprises the step of implementing a forward error correction coding across multiple symbols of said signal to minimize error probability of transmitted symbols.

11. The method of claim 1, wherein the step of coding further comprises a step of scrambling retransmissions of said at least one sample of said corresponding symbol of said signal to ensure that transmitted data between an initial transmission and retransmission is uncorrelated.

12. The method of claim 1, wherein said step of multiplexing and modulating further comprises a step of performing an inverse transform for reversibly transforming said blocks of N data streams from a frequency domain to a time domain.

13. A transmitter apparatus for transmitting a multi-carrier multiplexed signal to be transmitted and reducing a peak-to-average power ratio of said signal, said apparatus comprising:
   a coder for accepting an input data stream and coding said data stream into blocks of N data streams, where N represents a number of subcarriers in said signal;
   a multiplexing circuit for multiplexing data of said N data streams to modulate said subcarriers and provide symbols of modulated data;
   a peak cancellation circuit coupled to said multiplexing circuit for subtracting a reference function from said symbols having a peak power amplitude exceeding a predetermined threshold, such that subtraction of said reference function reduces peak power of at least one signal sample in a symbol; and
   a transmission circuit coupled to said peak cancellation circuit for transmitting said symbols representative of said signal;
   wherein said peak cancellation circuit includes:
      a peak detection circuit for detecting if said peak power of a symbol exceeds said threshold:
      an impulse generator for generating impulses having phases substantially equal to a peak phase of a corresponding one of said symbols and having an amplitude substantially equal to a peak amplitude of said corresponding one of said symbols minus a desired maximum amplitude: and
      a lowpass filter for filtering said impulses on a symbol by symbol basis.

14. The apparatus of claim 13, wherein said reference function includes a combination of one or more functions selected from a group consisting of a sinc function, a windowed sinc function and a cyclic convolution function.

15. The apparatus of claim 13, further including a windowing circuit for windowing said signal samples and adding a cyclic prefix to a windowed signal sample to include a guard band.

16. The apparatus of claim 14, wherein said lowpass filter is selected from a group consisting of a lowpass filter in a frequency domain and a lowpass filter in a time domain.

17. The apparatus of claim 13, wherein said peak cancellation circuit includes a look up table, said reference function being selected from said look-up table.

18. The apparatus of claim 13, wherein said coder is operable to implement a forward error correction coding across multiple symbols of said signal to minimize error probability of transmitted symbols.

19. The apparatus of claim 13, wherein said transmitter is operable to scramble retransmissions of said signal samples to ensure that transmitted data between an initial transmission and retransmission is uncorrelated.

20. The apparatus of claim 13 wherein said multiplexing circuit includes an inverse transform means selected from a group consisting of Inverse Fast Fourier Transform and Inverse Walsh Transform.

* * * * *